Feb. 19, 1924.

W. D'A. RYAN 1,484,309

VEHICLE LAMP

Filed Nov. 28, 1923

Walter D'Arcy Ryan
Inventor

By Dodson & Roe
Attorneys

Patented Feb. 19, 1924.

1,484,309

UNITED STATES PATENT OFFICE.

WALTER D'ARCY RYAN, OF SCHENECTADY, NEW YORK.

VEHICLE LAMP.

Application filed November 28, 1923. Serial No. 677,404.

*To all whom it may concern:*

Be it known that I, WALTER D'ARCY RYAN, a citizen of the United States, residing at Schenectady, in the county of Schenectady and State of New York, have invented a new and useful Improvement in Vehicle Lamps, of which the following is a specification.

My invention relates to the art of roadway illumination for vehicles and particularly to headlights which are adapted to adequately light the roadway and also perform the additional function of illuminating the forward part of the vehicle and a circular arc surrounding it.

In providing headlights for vehicles, under the existing requirement in practically all parts of the country, it is quite necessary to take into consideration the element of glare which must be eliminated or at least reduced to such a minimum, as to be practically negligible. Therefore, one of the principal objects of my invention is to eliminate this objectionable glare without the expense of detracting from the projection of a highly satisfactory beam of light for a long distance in advance of the vehicle.

Another object is to combine with this projected beam a dispersing of light rays in a circle extending completely around each lamp which will have the effect of illuminating the forward part of the vehicle and also the sides of the road.

I accomplish all these objects from a headlight in which is mounted but a single light source, a portion of the light rays from it being redirected by a reflector positioned in a practical and scientific way to produce the required projected beam, and the other light rays being released from the lamp to function as hereinbefore stated for illuminating the sides of the roadway and the forward part of the vehicle.

In considering this invention, it is desirable and necessary to have an understanding of the art of illumination and the results from the fusion of direct and reflected light rays. Experiments and tests have proven that a concentrated light beam projected from a headlight which is surrounded by darkness and which produces a decided glare, will be greatly reduced in the factor of glare if the light projector itself and surrounding mounting are bathed in light.

The very fact of projecting a beam from a source which is itself surrounded by light reduces materially, by simultaneous contrast, the glaring or intense effect that would otherwise be produced, and yet the illuminated field is as adequately and satisfactorily lighted as though the beam was projected from a source surrounded by total darkness.

My principal object is to construct a lamp adapted to function as above set forth and produce the effects by the use of reflecting and modifying means, together with positioning the light source in a specially constructed housing, surrounding the light source.

A further object of my invention is to cause the lamp which projects the beam to illuminate the roadway, to bathe the front of the vehicle and also the field surroundings the vehicle, with light which will sufficiently and adequately illuminate the sides of the road, ditches, cross roads and the foliage through which the vehicle may be passing. In addition to that, it is most convenient as it will enable the occupants of the vehicle to read the road directions that are posted along the highway.

In the drawings accompanying this application, I have illustrated one form of construction, but I wish it understood my invention discloses a newly discovered adaptation and utilization of principles controlling the modification of light rays, and equally satisfactory results may possibly be secured by several different means and therefore I do not wish to be limited in the scope of my invention, except as set forth in the appended claims.

Fig. 1 of the drawings is a more or less diagrammatic view to illustrate the general functioning of my device, indicating lines being inserted to show the distribution of the light rays.

Figure 1:
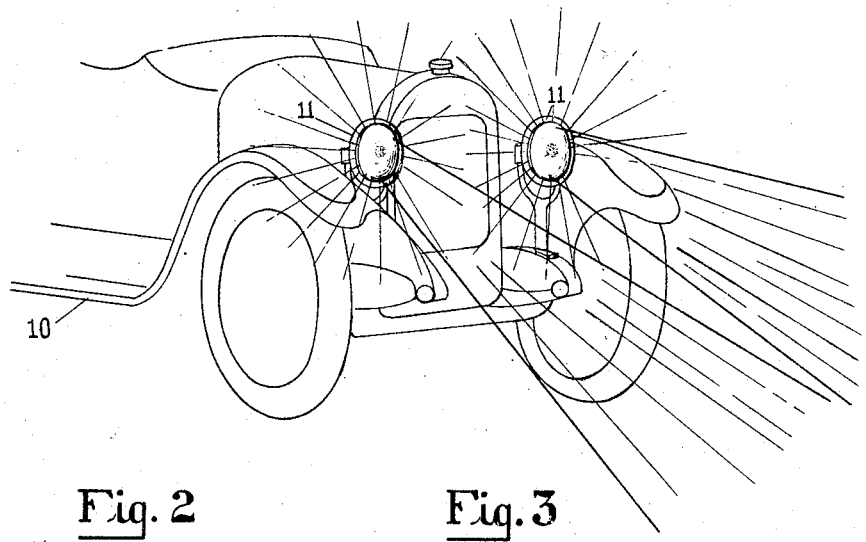
Figure 2:
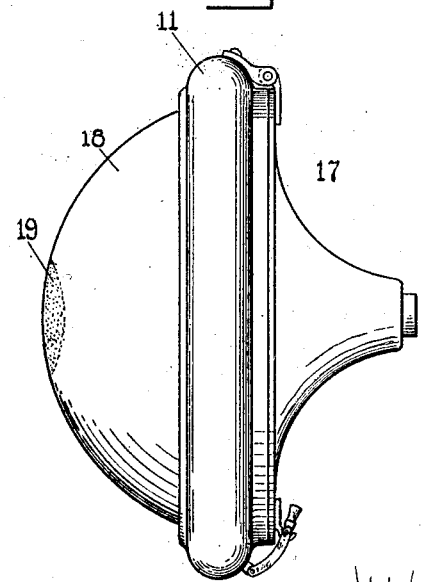
Fig. 2 shows a side elevation view of the particular form of headlight I have chosen to illustrate.
Figure 3:
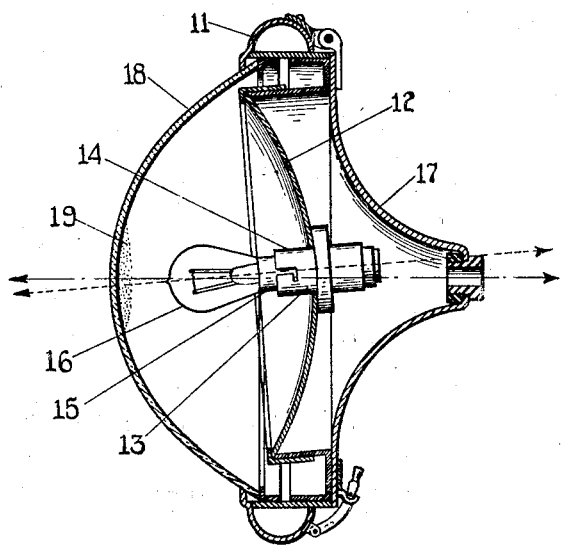
Fig. 3 shows a vertical sectional view of the same, with lines indicating the axis of the reflector and the housing.
Figure 4:
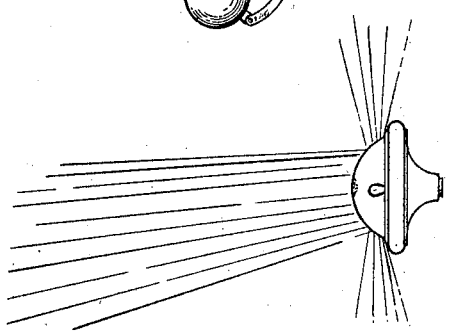
Fig. 4 shows a reduced side elevation view of the headlight with indicating lines which clearly set forth the paths taken by the reflected light rays and the direct light rays.

Referring to the accompanying drawings, the reference numeral 10 is used to indicate a vehicle (in this case an automobile) and the numeral 11 the housing of a headlight attached thereto. In the housing is mounted a shallow reflector 12, orificed centrally at 13 to permit of the passage therethrough of a lamp socket 14 to receive the base 15, of the lamp 16. It is preferably to use a glass parabolic reflector or its equivalent, a Mangin lens, on account of the specular qualities, although metal reflectors, under certain conditions, may be advantageously used.

The reflector 12 is secured in the housing with its periphery in close proximity with the forward edge surface thereof, but is slightly tilted forward at its upper end, thus causing its lower end to be slightly seated further back in the housing. As stated, the reflector is of a shallow type, and the lamp socket 14 is so located and positioned that the lamp 16, when secured therein, projects forwardly beyond the plane of the housing, so that the filament thereof is beyond the plane of the housing. A door 17 is secured to the housing in any practical or satisfactory manner and a lens or light emitting closure 18 is secured therein, said lens bulging outwardly, as shown, to inclose the projecting lamp 16. The central portion of the lens or light emitting closure 18 is provided with diffusion means 19, if desired, to conceal the filament from direct view and to diffuse some of the forwardly directed rays.

The formation of the reflector, its positioning, and its relation to the lamp, constitute the very essence of my invention. As before stated, the reflector is of the shallow type, with a long focal length and the light source is substantially at the focal point of the reflector, the latter having its axis inclined to concentrate the beam which will issue, forwardly and slightly downwardly. This has the effect of projecting a beam a long distance forwardly on the roadway and yet it is inclined downwardly below the plane of the eye of an approaching driver of a vehicle or pedestrian. With a reflector of a long focal length, the entire effective specular area is utilized and its focal point could be located in a plane beyond the periphery of the casing as it is necessary to position the light source in relation to the periphery of the casing so that a portion of the direct rays may issue rearwardly, radially and forwardly from the casing closure.

In addition to this, the central portion of the lens or light emitting closure is provided with diffusion means, if desired, which shields the eye of an approaching person from the light source.

By this construction, it will be apparent that not only does the type of reflector and its relationship to the other elements of the device function to produce a practically glareless and efficient headlight, but that the vehicle itself and the surrounding space is bathed in light, thus causing the functioning light beam to be projected from a well lighted area.

Having thus described my invention, what I claim and desire to secure by Letters Patent of the United States is:

1. A vehicle lamp comprising a housing, a shallow reflector with a long focal length secured therein, its axis being inclined slightly downwardly from the axis of the housing, a light source mounted substantially at the focal point of the reflector, an outwardly projecting light emitting closure to inclose the light source, the relative positioning of the reflector, housing and light source being such that the light source is in advance of the housing and a concentrated beam is projected forwardly and slightly downwardly therefrom and direct rays are released to illuminate a circular area forwardly and rearwardly therefrom.

2. A vehicle lamp comprising a housing, a reflector of a long focal length secured therein, a light source mounted in the axis of the reflector and projecting beyond the forward periphery of the housing, means to depress the reflected beam of light, and an outwardly projecting light emitting closure inclosing the light source, so that a concentrated beam of light is projected forwardly and slightly downwardly, and direct rays from the source issue forwardly, upwardly, downwardly laterally and slightly rearwardly.

3. A vehicle lamp comprising a housing, a shallow reflector with a long focal length secured therein its axis being inclined slightly downwardly from the substantial horizontal axis of the housing, a light source mounted substantially near the focus of the reflector, an outwardly projecting light emitting closure to inclose the light source, the relative positioning of the reflector and light source in the housing being such that the light source projects beyond the forward periphery of the housing.

4. A construction as defined in claim 1 in which the light emitting closure is provided with a central diffusing area.

Dated November 27, 1923.

WALTER D'ARCY RYAN.